Figure 1:
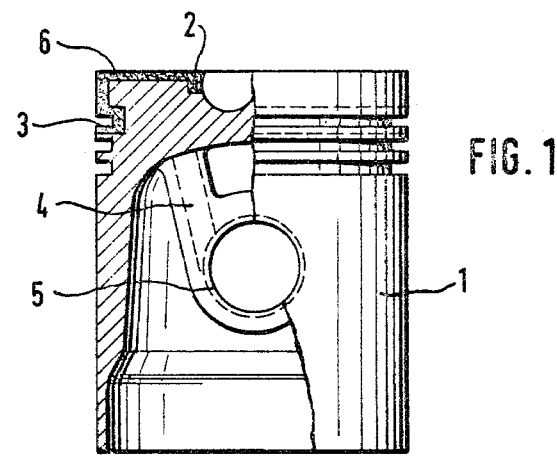

United States Patent [19]
Köhnert et al.

[11] 4,334,507
[45] Jun. 15, 1982

[54] PISTON FOR AN INTERNAL COMBUSTION ENGINE AND METHOD FOR PRODUCING SAME

[75] Inventors: Hans J. Köhnert, Esslingen; Walter Graf, Stuttgart; Ladislaus Jakl-Banka, Korb; Manfred Röhrle, Ostfildern, all of Fed. Rep. of Germany

[73] Assignee: Mahle GmbH, Stuttgart, Fed. Rep. of Germany

[21] Appl. No.: 154,133

[22] Filed: May 29, 1980

Related U.S. Application Data

[63] Continuation of Ser. No. 829,677, Sep. 1, 1977, abandoned.

[30] Foreign Application Priority Data

Sep. 1, 1977 [DE] Fed. Rep. of Germany ....... 2639294

[51] Int. Cl.³ .............................................. F02F 3/06
[52] U.S. Cl. .................................. 123/193 P; 92/213; 92/224; 164/120; 29/156.5 R
[58] Field of Search ...... 123/193 P, 193 CD, 191 SP, 123/191 A, 668, 669; 92/212, 213, 223, 224; 164/98, 120; 29/156.5 R

[56] References Cited

U.S. PATENT DOCUMENTS

| | | | |
|---|---|---|---|
| 1,264,893 | 5/1918 | Campbell | 92/224 |
| 1,356,695 | 10/1920 | Chase | 92/224 |
| 1,691,450 | 11/1928 | Soulis | 92/224 |
| 1,771,771 | 7/1930 | Campbell | 92/224 |
| 2,243,263 | 5/1941 | Starr | 92/213 |
| 2,336,918 | 12/1943 | Aske | 92/213 |
| 2,390,342 | 12/1945 | Aske | 92/213 |
| 2,473,254 | 6/1949 | Morris | 92/213 |
| 2,657,961 | 11/1953 | Lassberg | 92/212 |
| 2,983,563 | 5/1961 | McLean et al. | 92/223 |
| 4,292,936 | 10/1981 | Morishita et al. | 123/193 P |

FOREIGN PATENT DOCUMENTS

| | | | |
|---|---|---|---|
| 175954 | 9/1921 | United Kingdom | 92/224 |
| 162042 | 3/1955 | United Kingdom | 123/669 |

*Primary Examiner*—Charles J. Myhre
*Assistant Examiner*—E. Rollins Cross
*Attorney, Agent, or Firm*—Murray and Whisenhunt

[57] ABSTRACT

The invention provides a piston formed by casting a metal piston body under pressure around an insert, the body being made of aluminium or aluminium alloy and the insert being made of a porous layer having a thickness 20 to 50 times the pore diameter and completely filled with the piston body metal which projects from the body into the pores of the insert.

11 Claims, 2 Drawing Figures

PISTON FOR AN INTERNAL COMBUSTION ENGINE AND METHOD FOR PRODUCING SAME

This is a continuation application of Ser. No. 829,677, filed Sept. 1, 1977, now abandoned.

The invention relates to a piston having a body made of aluminium or aluminium base alloy for internal combustion engines which comprises at least one insert in a different material at thermally and/or mechanically particularly highly stressed positions.

Such inserts are provided, for example, in the piston ring area as so-called ring carriers and furthermore in the trough edge area or in the pin bosses so as to govern the thermal and/or mechanical stresses occurring at those points. Partly, the entire piston head and/or the top land—possibly together with the entire ring land area—are also formed from a material which can be subjected to higher stresses than the other aluminium piston material.

In many cases, the connection of these insert parts to the other piston material is problematical. It may be effected only mechanically by means of any possible kind of undercut and clamping or by intermetallic bonding. Both solutions are the generally known prior art.

Another type of connection is to be provided by the present invention. The principal object thereof is to form a zone of the greatest possible surface contact between the two materials, and thus of maximum mechanical bonding, between the insert part and the adjoining piston material.

This task is solved in that the inserts comprise, at least in the area where their surfaces adjoin the other piston material, a porous external layer and in that this layer has a thickness that is at least 20 to 50 times the pore diameter and is completely filled with the piston basic body aluminium which projects from the basic piston body into the pores of the inserts.

The production of the piston according to the invention is effected in that the piston is moulded by the aluminium piston basic material being pressed around the inserts at the casting temperature. The pressing pressure is chosen between 2.500 and 5.000 bars, depending on the thickness of the porous layer to be filled with the basic piston material and the pore diameter in the porous layer.

The thickness of the porous layer to be filled may have values ranging from 50 to 500 times the pore diameter of the layer.

The inserts themselves may either comprise only a porous edge layer or they may be porous over their entire area. If they are porous over the entire area, then they may expediently be filled with the basic piston material over this entire area.

To make the entire insert area porous and then to fill all the pores with the other piston material, consisting of aluminium or an aluminium alloy, proves to be particularly advantageous whenever the piston areas in which the inserts are provided should have special physical properties, which can only be obtained by a combination of the properties of at least two different materials. This is the case, for example, in annular grooves of highly stressed pistons; for these present the problem of the groove flanks being subjected to increased wear by the piston ring.

Due to the fact that the different materials are finely distributed in one another, the result is obtained that the porous material, which is more resistant to wear, forms a supporting framework allowing the wear to be reduced. The anchoring to the aluminium piston alloy is ensured by the pores which are filled with the aluminium alloy.

Another example is the armouring of the trough edge. On highly stressed pistons comprising combustion troughs, there is a danger of cracks being formed on the trough edge by alternating thermal stress.

In this instance, an insert part which is porous over its entire area provides the advantage that the temperature peaks on the trough edge are reduced, for example by means of incorporating materials of high thermal conductivities. Furthermore, through a suitable selection of the porous material, mainly with respect to the thermal expansion behaviour, the possibility is provided to produce in operation a connection stress condition which counteracts the normal thermal stresses in the aluminium causing the temperature change cracks.

The porous areas of the insert parts, that is to say possibly including the entire insert part, may be sintered or foamed up in the respective basic material of the insert part. By sintering and foaming it is possible to produce mainly parts of any desired shape and of high strength. According to the invention, this is of great importance relative to the introduction of the insert parts into the piston basic material.

Some materials and their applications as inserts at particular piston points will be given herein, only by way of example.

(a) Two different highly porous sintered materials, based on Cr-Ni steel, of the following physical properties:

|  | (a1) | (a2) | |
| --- | --- | --- | --- |
| Pore size (determined by the glass bead test, nominal) | 3 | 80 | μm |
| Porosity (open) | 26–30 | 32–38 | % |
| Density | 5,2–5,6 | 4,3–4,7 | g/cm3 |
| Tensile strength | 100–120 | 35–50 | N/mm2 |

Possibilities of use as insert parts in the aluminium piston:

Head
Top land
Ribs
Pin boss
Ring carrier (b) Highly porous sintered material, based on Ni-Cu (approximately 70% Ni, 30% Cu), of the following physical properties:

| Pore size (determined by the glass bead test, nominal) | 100 | μm |
| --- | --- | --- |
| Porosity (open) | 32–35 | % |
| Density | 4,5–4,9 | g/cm3 |
| Tensile strength | 45–65 | N/mm2 |

Possibilities of use as insert parts in the aluminium piston:

Head
Trough edge
Pin boss (c) Nickel sintered materials

| Physical properties:- | | |
| --- | --- | --- |
| Pore size | 7 | μm |
| Density | 5,3 | g/cm3 |

-continued

| Porosity | 41 % |
|---|---|
| Tensile strength | 1,5 kp/mm2 |

Possibilities of use:
  Pin boss
  Trough edge
  Ring carrier
  (d) Ni, Fe, Ni-FE foamed materials
Possibilities of use:
  Pin boss
  Trough edge
  Ring carrier
  (e) Highly porous sintered material, based on bronze (CuSn 10), of the following physical properties:

|  | (e1) | (e2) |  |
|---|---|---|---|
| Pore size (determined by the glass bead test, nominal) | 5 | 200 | μm |
| Porosity (open) | 25–28 | 32–38 | % |
| Density | 5,8–6,2 | 4,9–5,3 | g/cm3 |
| Tensile strength | 75–90 | 20–30 | N/mm2 |

Possibilities of use in pistons:
  Pin boss
  (f) Foamed materials in Cu
Possibilities of use in pistons:
  Trough edge The production of pistons comprising the insert parts according to the invention is effected by casting being performed around the insert parts in a casting mould at high pressure.

When using an aluminium piston alloy composed of

| Si | 11–13% |
|---|---|
| Cu | 0,8–1,5% |
| Mg | 0,8–1,3% |
| Ni | ≦1,3% |
| Fe | ≦0,7% |
| Ti | ≦0,2% |
| Mn | ≦0,3% |
| Zn | ≦0,3% |
| Al | remainder | the pores of the sintered material mentioned under (c) were completely filled with the piston alloy material at a depth of approximately 30 mm at casting temperatures ranging from 700° to 800° C. and at a solidification pressure of approximately 5000 bars. In the sintered materials according to a2 and (b), it was possible to reduce the pressure in order to reach the same depth, and the pressure was only approximately 2500 bars for the filling of the sintered material e2.

Figure 2:
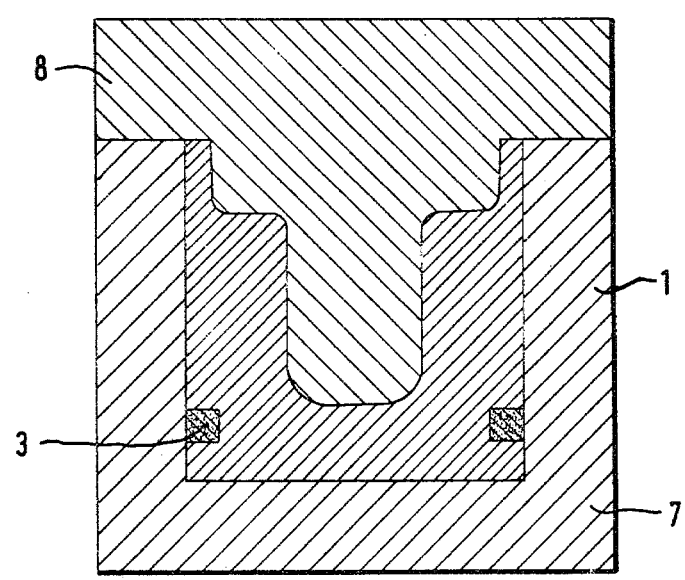

Some exemplified embodiments of the invention are illustrated in the drawing, in which FIG. 1 shows a longitudinal section through a piston comprising different porous inserts;

FIG. 2 shows a longitudinal section through the piston in the press mould.

The piston 1 comprises porous inserts forming the trough edge 2, the ring carrier 3, the rib reinforcement 4, the pin boss reinforcement 5 and the head plate with the integrally formed top land 6. All the inserts are porous in their entire area and are completely filled with the aluminium piston alloy indicated above. The material of the inserts is a sintered material based on Cr-Ni of a porosity of 80 μm.

In FIG. 2, there is illustrated how the piston 1 is moulded in a press chamber, in which the ring carrier 3 is placed, with the aid of the press ram 8.

We claim:

1. A piston for an internal combustion engine, comprising: a piston body formed of a material selected from the group consisting of aluminum and aluminum base alloys; and at least one insert formed of a material different to that of said piston body, said at least one insert having a portion connected to said piston body, said portion being formed of a porous material with a mean pore diameter of between 3 and 200 μm and a thickness of at least 20 times said mean pore diameter, said portion having its pores in the form of open pores, said at least one insert being connected to said piston body by the material of said piston body occupying the open pores of said porous material throughout said thickness.

2. A piston according to claim 1, wherein the thickness of said open pore portion is between 50 times said mean pore diameter and 500 times said mean pore diameter.

3. A piston according to claim 1, wherein said insert is of open pore structure throughout its entire volume.

4. A piston according to claim 1, wherein all the pores of said insert material are filled with said piston body material.

5. A piston according to claim 1, wherein said porous material has a mean pore diameter of between 3 to 100 μm.

6. A piston according to claim 1, wherein said porous material is a sintered material.

7. A piston according to claim 1, wherein said porous material is a foamed material.

8. A piston according to claim 1, wherein the insert is made of an open pored material selected from Cr-Ni steel, Ni-Cu alloy, nickel and nickel-iron alloy.

9. A piston according to claim 1, wherein the insert is made of an open pored material selected from copper or bronze.

10. A piston for an internal combustion engine, comprising: a piston body formed of a material selected from the group consisting of aluminum and aluminum base alloys; and at least one insert formed of a material different to that of said piston body, said at least one insert having a density not exceeding 6.2 g/cm³ and having a portion connected to said piston body, said portion being formed of a porous material with a mean pore diameter of between 3 and 200 μm and a thickness of at least 20 times said mean pore diameter, said portion having its pores in the form of open pores, said at least one insert being connected to said piston body by the material of said piston body occupying the open pores of said porous material throughout said thickness.

11. A method of making a piston for an internal combustion engine, comprising placing at least one porous insert in a press chamber at least a portion of said insert formed of a porous material with a mean pore diameter of between 3 and 200 μm and a thickness of at least 20 times said mean pore diameter, said pores in the form of open pores, and thereafter forming said piston of aluminum piston basic material by introducing said piston basic material into said press chamber and pressing said piston basic material at a pressure of between 2500 and 5000 bars to completely fill said pores with said piston basic material and to form the piston body.

* * * * *